US010647411B2

(12) United States Patent
De Wergifosse (10) Patent No.: US 10,647,411 B2
(45) Date of Patent: May 12, 2020

(54) ELECTROMECHANICAL PITCH ACTUATION SYSTEM FOR A TURBOMACHINE PROPELLER

(71) Applicant: Safran Aircraft Engines, Paris (FR)

(72) Inventor: Huguette De Wergifosse, Saint Augustin (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 212 days.

(21) Appl. No.: 15/847,619

(22) Filed: Dec. 19, 2017

(65) Prior Publication Data
US 2018/0170523 A1    Jun. 21, 2018

(30) Foreign Application Priority Data

Dec. 21, 2016  (FR) ...................... 16 62963

(51) Int. Cl.
*B64C 11/44*        (2006.01)
*B64C 11/32*        (2006.01)
(Continued)

(52) U.S. Cl.
CPC ............ *B64C 11/44* (2013.01); *B64C 11/325* (2013.01); *F16H 25/20* (2013.01); *B64D 27/10* (2013.01);
(Continued)

(58) Field of Classification Search
CPC ....... B64C 11/44; B64C 11/325; F16H 25/20; F16H 2025/2075; F16H 2025/2087; B64D 27/10
See application file for complete search history.

(56) References Cited

U.S. PATENT DOCUMENTS 4,591,313 A * 5/1986 Miyatake .............. B64C 11/306
                                                            416/127
5,199,850 A * 4/1993 Carvalho .............. B64C 11/325
                                                            416/153
(Continued)

FOREIGN PATENT DOCUMENTS

EP          2384965          11/2011
EP          2384965 A2 * 11/2011 ........... B64C 11/325
(Continued)

OTHER PUBLICATIONS

"French Preliminary Search Report," FR Application No. 1662963 (dated Sep. 13, 2017) (with English translation cover sheet).

*Primary Examiner* — Woody A Lee, Jr.
*Assistant Examiner* — Brian Christopher Delrue
(74) *Attorney, Agent, or Firm* — Womble Bond Dickinson (US) LLP (57) ABSTRACT

Pitch actuation system for a turbine engine propeller, comprising an actuator, a movable part of which is configured to be connected to blades of the propeller so as to rotate them relative to the blade pitch axes (B), comprising:
  a transmission screw that can rotationally and translationally move along a longitudinal axis (A), a nut, through which said transmission screw passes and which cooperates with this screw so as to translationally displace along the axis (A) with a view to modifying the pitch of the propeller blades, and means for decoupling between the rotation of the propeller and said nut, which is rotationally fixed;
  first blade pitch control means, which comprise at least one electric motor setting a component into rotation through a planet reduction gear with a view to modifying the position of the transmission screw;
  second blade feathering means configured to act on the transmission screw with a view to modifying the pitch of the blades if the first means are inactive, (Continued)

and in that said first planet reduction gear comprises a ring gear rigidly connected to said first component, a planet shaft rigidly connected to said first rotor and a planet carrier rigidly connected to said first housing.

13 Claims, 1 Drawing Sheet

(51) Int. Cl.
    *F16H 25/20*     (2006.01)
    *B64D 27/10*     (2006.01)

(52) U.S. Cl.
    CPC .... *F05D 2220/324* (2013.01); *F05D 2260/74* (2013.01); *F05D 2260/79* (2013.01); *F16H 2025/2075* (2013.01); *F16H 2025/2087* (2013.01)

(56) References Cited

U.S. PATENT DOCUMENTS

| | | | |
|---|---|---|---|
| 5,931,637 A * | 8/1999 | Wheeler | B63H 3/06 416/161 |
| 8,740,565 B2 * | 6/2014 | Perkinson | B64C 11/48 416/129 |
| 2010/0021295 A1 * | 1/2010 | Perkinson | B64C 11/06 416/1 |
| 2011/0238187 A1 * | 9/2011 | Evans | A45B 9/00 623/27 |
| 2011/0274545 A1 * | 11/2011 | Morgan | B64C 11/32 416/151 |
| 2013/0170988 A1 * | 7/2013 | Guey | F03D 7/0224 416/9 |
| 2016/0281732 A1 * | 9/2016 | Lardy | F04D 29/30 |
| 2017/0306773 A1 * | 10/2017 | de Wergifosse | F01D 5/02 |

FOREIGN PATENT DOCUMENTS

| | | | | |
|---|---|---|---|---|
| FR | 973292 | | 2/1951 | |
| FR | 973292 A | * | 2/1951 | ........... B64C 11/306 |
| FR | 2311947 | | 12/1976 | |
| FR | 2311947 A1 | * | 12/1976 | ........... F04D 29/323 |
| WO | WO-2013076431 | | 5/2013 | |
| WO | WO-2013076431 A1 | * | 5/2013 | |

* cited by examiner

ELECTROMECHANICAL PITCH ACTUATION SYSTEM FOR A TURBOMACHINE PROPELLER

TECHNICAL FIELD

The present invention relates to a pitch actuation system for a propeller for a turbine engine, such as a turboprop engine.

PRIOR ART

A turboprop engine comprises at least one propeller comprising a hub and blades supported by the hub and extending substantially radially outwards relative to the hub and to the axis of rotation of the propeller.

The turboprop engine is generally equipped with a propeller pitch actuation system, also called propeller blade angular pitch system. Adjusting the pitch of the propeller blades allows their efficiency to be improved while guaranteeing a propeller rotation speed for each flight phase.

Each blade can be rotated about an axis, which is generally radial, between a first emergency position, called feathering position, in which it extends substantially parallel to the axis of rotation of the propeller, and a second position, in which it is sharply inclined relative to this axis. It can adopt any position between these two extreme positions.

In the prior art, the actuation system that is used is a hydraulic system, which is relatively complex and has several disadvantages. This system comprises an actuator, a movable part of which is connected to the propeller blades so as to adjust their pitch.

The actuation system not only must be able to provide the pitch control function, but also the emergency blade feathering function. The pitch actuation system thus comprises an auxiliary system for the emergency function.

A malfunction associated with a leak in the hydraulic system, which is commonly arranged between the pitch control system and the auxiliary system, must be safeguarded against. Without a pressure source, it is essential that counterweights are added to the blades in order to provide the feathering function.

The pitch actuation system also must provide protection functions in the event of overspeed, in the event of engine cut-out, in the event of a failure of the FADEC (Full Authority Digital Engine Control) computer, and must ensure that low pitches in flight are limited. A set of mechanical systems and of hydraulic systems thus forms part of the pitch actuation system for providing these functions in the prior art.

The pitch control system is also subject to extremely strict malfunction rate requirements, which involve redundancies and additional protection systems.

To conclude, the technology and the operating principle of a hydraulic propeller pitch actuation system are currently complex. A host of hydraulic components integrate these systems.

The present invention allows these disadvantages to be overcome and provides a solution to all or part of the problems of the aforementioned prior art.

The first problem (problem A) relates to the strict FHA (Functional Hazard Assessment) requirements for pitch control, which involve robust architectures with redundancy.

The second problem (problem B) relates to the feathering function, which must be able to be provided even after a failure in the pitch control means.

The third problem (problem C) relates to the risk of locking the movable part of the actuator. In a hydraulic system, a blade of the propeller is rotated by the translation movement of an eccentric member at the root of the blade. Axial locking of the hydraulic actuator is considered to be a failure.

Furthermore, in a hydraulic system, the rotation of the propeller is transmitted to the hydraulic actuator positioned in the rotating reference (piston and body without angular displacement). This actuator is fed by pipes via a hydraulic spool positioned in the fixed reference. In this hydraulic inventive idea, the rotation of the propeller does not cause any offset of the propeller pitch. The fourth problem (problem D) relates to the management of this phenomenon.

Finally, the fifth problem (problem E) relates to protection functions other than those safeguarding against the failure of the pitch control, which require additional mechanical and hydraulic devices in a hydraulic system of the prior art.

DISCLOSURE OF THE INVENTION

The invention proposes a pitch actuation system for a turbine engine propeller, comprising an actuator, a movable part of which is configured to be connected to blades of the propeller so as to rotate them relative to the blade pitch axes, characterised in that the actuator is an electromechanical actuator comprising:
  a main transmission screw that can move with a degree of rotational freedom and a degree of translational freedom along a longitudinal axis;
  a main nut, through which said main transmission screw passes and which cooperates with this screw so as to translationally displace along the axis;
  means configured so that a translational displacement of the nut causes a modification to the pitch of the propeller blades but so that a rotational displacement of the propeller does not cause a rotational displacement of the nut;
  first blade pitch control means mounted in a first rotationally locked housing, which means comprise at least one electric motor for driving a first rotor about the axis, and a first component, for example a screw, set into rotation about the axis by said first rotor by means of a first planet reduction gear, the system being configured to move the main transmission screw in a first of its two degrees of freedom from a rotation of said first component;
  second feathering means, which comprise at least one second electric motor for driving a second rotor about the axis, the system being configured to move the main transmission screw in the second of its two degrees of freedom when said at least one second electric motor is activated and to block said movement when said second electric motor is not activated,
and in that said first planet reduction gear comprises a ring gear rigidly connected to said first component, a planet shaft rigidly connected to said first rotor and a planet carrier rigidly connected to said first housing, so as to block the rotation of the ring gear, and thus of the first component, in the event that an axial force absorption bearing is blocked in the first blade pitch control means.

In this architecture, the pitch control means can activate the main transmission screw in its first degree of freedom without interfering with the feathering means, which, being inactive, block the second degree of freedom of the main transmission screw.

However, in the event of the blockage of a radial pitch control force absorption bearing, the feathering control can be activated and can be operational with the first component of the pitch control means inactive, as the planet carrier of the planet reduction gear is "naturally" rotationally blocked. The one or more electric motor(s) of the first pitch control means thus can be synchronous machines so as not to generate resistive torque and a supply is not required for said synchronous machines for feathering with a view to blocking said first component.

In a hydraulic system, the rotation of a propeller blade is obtained by the translation movement of an eccentric member at the root of the blade. The failure originating from the axial blocking of the hydraulic actuator (problem C), which generates this translation movement, is considered to be highly unlikely. This low malfunction rate value seems to be supported by lessons learned. With the system according to the invention, the basic system comprises a redundancy for the transmission screw:

- if the main transmission screw is blocked in the nut, pitch control and feathering still can be performed by the means that act on its degree of translational freedom;
- if the system that controls the translation movement of the transmission screw is blocked, pitch control and feathering still can be performed by the means that act on the degree of rotational freedom of the main transmission screw.

According to a preferred embodiment:

- said first housing is translationally fixed along the axis;
- the first blade pitch control means comprise a transmission device, for example, a screw/nut, comprising said first component and a second component cooperating with said first component in order to obtain a translation movement along the axis; and
- the second feathering means are configured to set the main transmission screw into rotation and to transfer the translation movement of said second component to the main transmission screw.

In this embodiment, the system comprises a redundancy for the transmission screw:

- if the main transmission screw is blocked in the nut, which is highly unlikely as this first screw is not active during pitch control, pitch control and feathering still can be performed by the first rotor of the pitch control means, which rotor translationally moves the second component of its transmission device, said device transferring an overall translation movement to the second means and thus to the means for coupling with the propeller; indeed, the electric motor of the second feathering means must not be activated to block the rotation of the transmission screw since this is blocked by the anti-rotation of the nut;
- if the device for transferring translation movement of the first pitch control means is blocked, pitch control and feathering still can be performed by the second rotor, which sets the main transmission screw into pure rotation; indeed, by activating the second electric means, the nut is set into translation movement by the rotation of this main transmission screw, due to the translational blocking of the second component of the transmission device.

Furthermore, this provision allows the first pitch control means to be mounted in a fixed housing. They therefore do not move when they are active. In particular, this improves the reliability of the assembly of these means, which currently are implemented during the operation of the turboprop engine. Certainly, in pitch control operation, the assembly forming the first pitch control means that integrate the larger electric motors do not displace translationally, but only the assembly that integrates the smallest electric motor displaces.

With respect to problem B, in the event that a problem affects the first rotor of the pitch control means by blocking said means, the particular configuration of the planet reduction gear also blocks the rotation of the first component. In this case, the corresponding degree of freedom of the transmission screw is blocked and feathering can be provided by the second means by controlling the other degree of freedom of the screw.

Overdimensioning the screw is one solution to the aforementioned problem C. However, the fatigue design of the screw does not encapsulate all the aspects associated with the various types of malfunctions (pollution, icing, etc.). The invention satisfactorily meets this requirement.

With respect to problem E, the proposed inventive idea does not require any additional device, unlike the hydraulic system, in order to safeguard the protection functions other than those safeguarding against failure of the pitch control. In a hydraulic system, the case of engine cut-out or loss of engine power results in a suppression of the hydraulic energy in the pump coupled to the engine, and an auxiliary system thus needs to be provided. In an electromechanical system, in the event of these types of malfunctions, the electric energy is delivered by an independent source. The feathering function thus remains active in order to safeguard against these types of malfunctions, preferably via a protection unit. In a hydraulic system, the case of overspeed is safeguarded against by a mechanical counterweight system. In the electromechanical system, preferably by virtue of a speed feedback, the engine control laws can act on the electric pitch control motors via the protection unit in order to provide the feathering.

Furthermore, decoupling the rotation of the propeller with the actuator allows the pitch of the blades to be maintained without running the electric motors during the rotation of the propeller, which reduces energy consumption and minimises motor wear. Without this decoupling, the size of the rotating machines and of the electronic unit would be adversely affected as it is dependent on the electrical power to be delivered.

FHA reliability also stipulates another requirement: no single malfunction can result in uncontrolled operation and thus a loss of control.

In order to cover this requirement all blocking cases must be analysed with their impact. The case of blocking the transmission screw and the case of blocking the transmission device have been analysed already.

The cases of blocking of bearings also must be analysed:

- if the bearings located in the planet reduction gear or the angular contact bearing of the second feathering means are blocked, the first pitch control means nevertheless remain operational and feathering also can be controlled by these first pitch control means;
- if the bearings located in the planet reduction gear or the angular contact bearing of the first pitch control means are blocked, the second feathering means nevertheless remain operational; the second feathering means are only operational if the transmission device is anti-rotationally blocked; however, the rotation of the first component of the transmission device is indeed blocked when the bearings of the planet reduction gear are blocked or the angular contact bearing is blocked;
- if the radial force absorption bearing on the first pitch control means side is blocked, the electric motor of the second feathering means can be supplied with power and the functionality is acquired as the ring gear of the planet reduction gear will rotationally block as a result; indeed, this blocking of the ring gear is acquired by the careful arrangement of the planet reduction gear, especially the planet carrier fixed to the housing; the synchronous machines of the first pitch control means must no longer be supplied to generate an anti-rotation torque so as to be able to provide the feathering.

Advantageously, said at least one electric motor of the second blade feathering means comprises a stator supported by a second housing that is mounted to translationally slide only along the axis in the first housing.

Preferably, the second component of the transmission device of the first blade pitch control means is rigidly connected to the second housing.

Preferably, said first component is rotationally guided on said first housing by a pair of angular and reversed contact bearings.

Said pair of bearings allows the axial forces to be absorbed on the housing that can be exerted on the first component during the operation of the system.

Also preferably, said first rotor is rotationally guided on said first housing by at least one bearing configured to absorb axial forces.

Advantageously, said first pitch control means comprise two electric motors, preferably synchronous motors, for driving the same first rotor. The selection of the technology and the strategy for designing these electric means allows the short-circuiting torque to be minimised and results in reasonably sized motors.

The electrical redundancy in the electric motors allows the FHA reliability requirements (problem A) to be met. In order to maintain a simple architecture, sharing the rotors of the electric motors is proposed herein. This allows only one transmission chain to be maintained and a relatively compact system to be provided. The proposed inventive idea offers this advantage.

Preferably, the second blade feathering means comprise at least one electric motor arranged to introduce a residual reluctance torque capable of rotationally blocking the main transmission screw.

In this way, the first means can control the pitch of the blades by setting the main transmission screw into pure translation movement, while keeping the second feathering means inactive.

Advantageously, the main transmission screw is connected to the second rotor by a second reduction gear, for example, a planet reduction gear.

The proposed system is preferably capable of providing the required reliability through an electrical redundancy in the electrical components, in the control and in the independent supply circuits controlled by a computer. This system is then capable of fulfilling its pitch control function even in the event of a short-circuit in the electrical power supply.

Advantageously, said first means comprise at least two resolvers and/or the two electric motors of said first means are respectively connected to two separate electronic control units.

This electromechanical inventive idea may not require any mechanical energy originating from the turbine engine. Malfunctions involving loss of engine power and engine cut-out thus can be safeguarded against via a protection unit by the nominal electromechanical system without any additional device. This electromechanical inventive idea also allows the case of overspeed and the failure of the FADEC to be safeguarded against without an additional device.

The present invention further relates to a turbine engine, such as a turboprop engine, comprising a propeller, the blades of which are variable-pitch blades, and a system as previously described, in which the main nut drives means that cooperate with eccentric members provided on plates for supporting and rotating blades.

The invention further relates to a method for actuating the pitch of the blades of a turbine engine propeller by means of a pitch actuation system comprising an electromechanical actuator, a movable part of which comprises a main transmission screw that can move with a degree of rotational freedom and a degree of translational freedom along a longitudinal axis and is configured to rotate the propeller blades relative to the blade pitch axes from one or the other of said two degrees of freedom, the method being characterised in that it comprises at least:

one first step comprising modifying the blade pitch by moving the main transmission screw in a first of its two degrees of freedom through the action of a first component, for example, a screw, of first blade pitch control means, which comprise at least one first electric motor for driving a first rotor about the axis so as to set said first component into rotation about the axis by said first rotor by means of a first planet reduction gear;

one second step comprising feathering the blades by moving the main transmission screw in the second of its two degrees of freedom through the action of second feathering means, which comprise at least one second electric motor for driving a second rotor about the axis, and by blocking said first degree of freedom when said at least one first electric motor is not activated, the blocking of said first degree of freedom during the second step being provided, in this case, by the fact that said first component is rigidly connected to a ring gear of said first planet reduction gear, and that a planet carrier of said first reduction gear is fixedly held, said first rotor being rigidly connected to a planet shaft.

In particular, the method can be implemented by a system as previously described.

DESCRIPTION OF THE DRAWINGS

The invention will be better understood, and further details, features and advantages of the invention will become more clearly apparent, upon reading the following description, which is provided by way of a non-limiting example, and with reference to the accompanying drawings, in which.

DETAILED DESCRIPTION

Firstly, reference will be made to FIG. 1.

A propeller 10 for a turbine engine, and particularly a turboprop engine, is generally unducted and comprises a movable hub 12 (arrow θH in FIG. 1) with an axis of rotation A, with the hub supporting blades 14, which extend substantially radially relative to the axis A. Each blade 14 is connected at its radially internal end to a substantially cylindrical plate 16 for supporting and rotationally guiding the blade in order for it to rotationally pitch about an axis B, which in this case is substantially radial. The plate 16 of each blade 14 is mounted in a compartment of the hub 12 and is centred and guided in this compartment by bearings 18 extending about the axis B. The radially internal end of each blade comprises an eccentric member 20, which is rigidly connected to the plate 16 and can be rotated about the axis B by an actuation system 22. The displacement of the eccentric members 20 causes the plates 16 and thus the blades 14 to rotate about the axes B. Each blade 14 can be set to a pitch or to a given position about its axis B, between two extreme positions, one of which, called feathering position, corresponds to the case where the line of the transverse section of the blade extends substantially parallel to the axis A.

In the prior art, the actuation system was hydraulic and had various disadvantages. FIG. 1 shows an electromechanical actuation system according to the invention.

Figure 1:
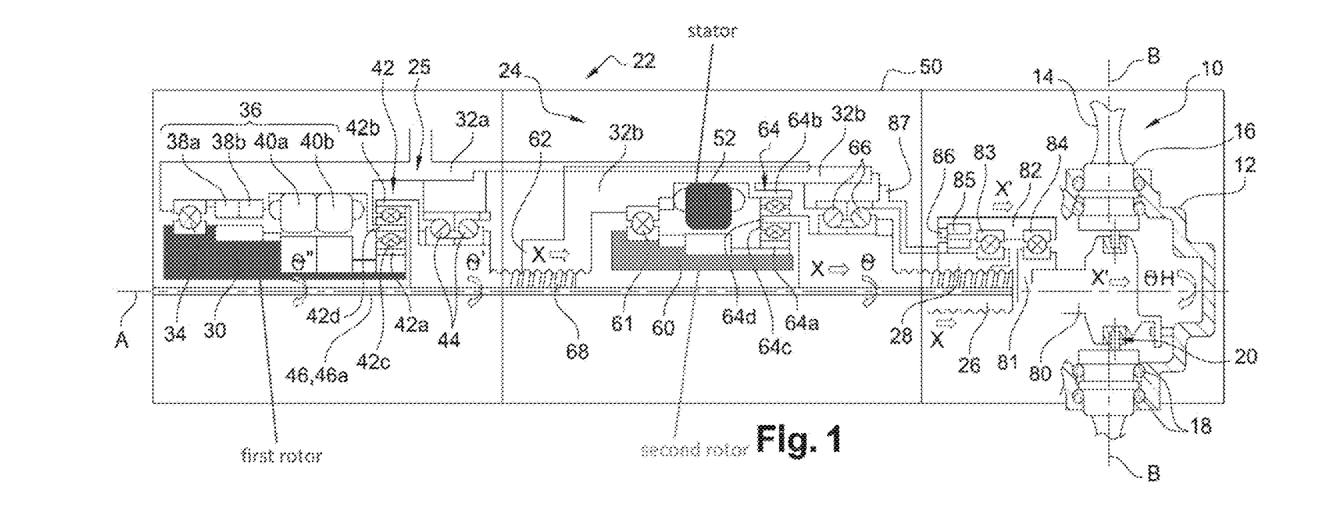
FIG. 1 is a partial schematic half-view in an axial section of an embodiment of a blade pitch actuation system according to the invention associated with a turbine engine propeller.

The actuation system 22 of FIG. 1 comprises an electromechanical actuator 24 comprising a fixed housing 32a and a housing 32b that is translationally movable along the axis A but is rotationally blocked about this axis A by anti-rotation means. These means can be slides on the fixed housing 32a.

The actuation system 22 further comprises a movable part, which comprises a transmission screw 26 that is associated with a nut 28.

The transmission screw is rotationally movable about the axis A (arrow A) and translationally movable along this axis (arrow X).

The nut 28 is translationally guided relative to the hub 12 by anti-rotation means 87 of the nut 28 on the transmission screw 26. These means 87 in this case comprise an axial finger that is supported by the movable housing 32b and is engaged in a compartment having a shape matching that of the nut 28. The nut 28 is thus also arranged to be translationally movable relative to the axis A in the same fixed reference.

The transmission screw 26 passes through the nut 28 and thus comprises a thread in addition to that of the nut. It is understood that rotating the transmission screw 26 (arrow θ in FIG. 1) causes a translational displacement of the nut 28 along the axis A (arrow X'). The transmission screw 26 advantageously has a reversible function in that it can undergo rotation torque from the actuator so as to cooperate with and move the nut, and it also can undergo axial forces from the nut causing the transmission screw to be set into rotation. At this point, it differs from an endless screw, which has an irreversible function.

The transmission screw is also able to undergo axial forces from the actuator 24. In this case, it is understood that an axial displacement (arrow X) of the transmission screw causes an axial displacement (arrow X') of the nut 28, which will be the same value if the transmission screw is also rotationally blocked (θ=0).

Coupling with the eccentric members 20 of the blades 14, with a view to rotating them relative to the axis B, occurs by virtue of the decoupling means described hereafter.

A component 80 is translationally and rotationally movable relative to the axis A. It comprises holes for receiving eccentric members 20 of the blades 14 and is thus constrained to rotate with the blades 14. It is therefore intended to rotate with the propeller 10 about the axis A following its rotation θH. These translational displacements along the axis A allow the eccentric members, and thus the blades 14, to displace about their axes B.

The component 80 comprises a cylindrical end engaged in a blind hole of a sleeve 81. The nut 28 and the sleeve 81 are surrounded by a movable ring 82. A first angular contact bearing 83 (in this case a ball bearing) is mounted between the nut 28 and the ring 82 and a second angular contact bearing 84 (a ball bearing) is mounted between the sleeve 81 and the ring 82. Conventionally, the internal ring of each bearing 83, 84 is respectively constrained to rotate with the nut 28 or the sleeve 81, and its outer ring is constrained to rotate with the ring 82.

The angular contact bearings 83, 84 allow the translation movement X' of the nut 28 to be transferred to the member 80 and then to the eccentric members 20 subject to the rotation of the propeller 10. The displacement of the eccentric members 20 in turn causes a rotation of the blades 14 relative to the axis B. The displacement of the eccentric members depends on the balance between the external force and the force developed by the actuator 24 by means of the transmission screw 26.

However, the rotation θH of the propeller is decoupled from the movement of the nut 28 by virtue of the angular contact bearing 84. The movement of the nut 28 thus can be limited to the translation movement.

Furthermore, maintaining the pitch of the propeller blades does not require setting the transmission screw 26 into rotation, since its rotational movement is decoupled from that of the propeller by the aforementioned mechanism.

Moreover, an electric motor 85 is mounted between the nut 28 and the ring 82 and comprises a stator rigidly connected to the nut and a rotor rigidly connected to the ring. This motor 85 is associated with a sensor 86, which is also mounted between the nut 28 and the ring 82 and comprises a stator element rigidly connected to the nut and a rotor element rigidly connected to the ring. The sensor is of the Hall effect or inductive type for controlling the rotation of the outer ring.

The decoupling means further comprise a device for controlling the status of the two bearings 83, 84 when shutdown. This device is made up of the elements of the motor 85 and of the sensor 86. Upon motor shutdown, the motor 85 sets the outer ring of the two bearings 83, 84 into rotation by delivering sufficient torque to overcome the friction of these two bearings. The rotation of the outer ring is then controlled by the sensor 86. In the event of the seizing or ageing of only one of these two bearings, the degradation can be observed both by the value of the motor current and by the rotation of the outer ring. This device thus eliminates any risk of a hidden failure before flight. In the event that one of the angular contact bearings blocks, the other fulfils the decoupling function and prevents the anti-rotation means from breaking.

This electromechanical inventive idea, by virtue of the decoupling of the propeller and its control device, allows the power of the actuator, the size of all the electrical components and the size of all the mechanical components to be reduced by relieving stresses.

The actuation system 22 further comprises at least one sensor 46 of the LVDT (Linear Variable Differential Transformer) type. In the example shown, the transmission screw 26 comprises an internal axial bore, in which a ferromagnetic LVDT plunger 46a is engaged in a sliding manner, which plunger is supported by a rear cowl of the actuator 24, which itself is fixed to the fixed housing 32a. Even though it is not shown, the plunger 46a is surrounded by a plurality of windings supported by the transmission screw 26, at least one primary winding of which is fed by an alternating current and two secondary windings. These windings are preferably redundant in order to increase the reliability of the system. The axial displacement of the plunger 46*a* inside the windings channels the flow and generates voltages in the secondary windings, the amplitudes of which depend on the position thereof. The sensor 46 thus provides a voltage that is proportional to the displacement of the plunger 46*a*.

The actuator 24 comprises a first blade pitch control system 25 comprising first electric means 36 that drive a rotor 30. The rotor 30 has an elongate shape with an axis A and in this case is guided in the fixed housing 32*a* by at least one bearing 34. The bearing 34, in this case a roller bearing and, more specifically, a ball bearing, is mounted at the axial end of the electromechanical actuator 24, opposite the propeller (left-hand end of the drawing).

In the example shown, the first electric means 36 comprise two resolvers 38*a*, 38*b* and two electric motors 40*a*, 40*b*, which in this case are synchronous machines. The resolvers 38*a*, 38*b* are disposed next to each other and share the axis A. The electric motors 40*a*, 40*b* are disposed next to each other and also share the axis A. The resolvers 38*a*, 38*b* in this case are disposed between the bearing 34 and the electric motors 40*a*, 40*b*.

Each resolver 38*a*, 38*b* comprises a resolver rotor mounted on the common rotor 30 and a resolver stator rigidly connected to the housing 32*a*. The resolver rotors and stators are generally formed by windings. In a known manner, a resolver allows an electric value to be obtained from a change of angle of a rotor. A resolver operates like a transformer, the coupling of which varies with the mechanical angle of the rotor. When the rotor winding is excited with an alternating voltage, an alternating voltage is recovered on the winding of the stator. The redundancy associated with the use of two resolvers 38*a*, 38*b* instead of one allows the aforementioned reliability requirements to be met.

Each electric motor 40*a*, 40*b* in this case is of the synchronous machine type and comprises a rotor mounted on the common rotor 30 and a stator rigidly connected to the housing 32*a*. The rotor can be made up of permanent magnets or can be made up of a winding fed with direct current and a magnetic circuit (electromagnet). In order to generate current, an outside force is used to rotate the rotor: its magnetic field, by rotating, induces an alternating electric current in the windings of the stator. The speed of this rotating field is called "synchronism speed". The synchronism speed is directly associated with the frequency of the electric power supply. The motors in this case are fed by a three-phase current system.

As can be seen in the drawing, the common rotor 30 drives a second transmission screw 68 using a gear reducer 42, which in this case is a planet reduction gear or an epicycloidal train.

According to the invention, the reducer 42 comprises:
- a planet shaft 42*a* constrained to rotate with the common rotor 30;
- an outer ring gear 42*b* surrounding the planet shaft and rigidly connected to the transmission screw 68;
- planet gears 42*c* meshing with the planet shaft 42*a* and the ring gear 42*b* and supported by a planet carrier 42*d* that is rigidly connected to the housing 32*a*.

Preferably, the planet gears 42*c* rotate between the planet shaft 42*a*, centred on the axis A, and the outer ring gear 42*b*.

In the example shown, the second transmission screw 68 and the ring gear 42*b* are formed as a single piece. The part comprising the planet carrier 42*d* and the transmission screw 68 is centred and guided in the housing 32*a* by a pair of roller bearings, in this case ball bearings. These bearings 44 are angular contact bearings. They are reversed and mounted next to each other between the reducer 42 and the screw 68.

The second transmission screw 68 is thus able to be set into rotation about the axis A by virtue of torque provided by the first electric means 36, but it is translationally blocked by the bearings 44, which absorb the axial forces on the fixed housing 32*a*.

The second transmission screw 68 passes through a second nut 62 and thus comprises a thread in addition to that of the nut. Anti-rotation means prevent the second nut 62 from rotating about the axis A relative to the fixed housing 32*a*.

It is understood that the rotation of the transmission screw 68 (arrow θ' in FIG. 1) causes a translational displacement of the nut 62 along the axis A (arrow X). The transmission screw 68 advantageously has a reversible function in that it can undergo rotation torque from the actuator so as to cooperate with, and move, the nut 62, and it also can undergo axial forces from the nut causing the transmission screw to be set into rotation. In this respect, as is the case for the first transmission screw 26, it differs from an endless screw, which has an irreversible function.

By virtue of the configuration of the planet reduction gear 42, in which the rotation speed of the planet carrier 42*d* is zero, with said planet carrier being rigidly connected to the fixed housing 32*a*, the Willis formula connects the rotation speed θ' of the part comprising the second screw 68 and the ring gear 42*b* to the rotation speed θ" of the first shaft 30 using the following equation:

$$\theta' = \lambda \cdot \theta'', \text{ where}$$

λ is a reduction ratio provided by the geometric features of the gears of the reduction gear 42.

This equation shows that the second transmission screw 68 is automatically blocked (zero angular speed θ') if the first shaft 30 is blocked (zero angular speed θ"). This particularly can correspond to a malfunction where the axial bearing 34 guiding said first shaft is blocked. In this type of malfunction, the first system is set, the second screw 68 cannot rotate, which means that the second nut 62 cannot translationally displace. The second nut 62 in this case thus forms a fixed abutment point for acting on the first transmission screw 26. When the radial pitch control force absorption bearing is blocked, the feathering control can be activated and this time will be operational as the planet carrier 42*d* of the planet reduction gear is "naturally" rotationally blocked.

In a variant that is not shown, this can be the second nut 62, which is set into rotation by the shaft 30 and the second transmission screw 68, which is rotationally restricted relative to the housing 32*a*, so as to translationally displace.

The turboprop engine is equipped with an auxiliary system 50 for feathering blades 14, which system in this case is electromechanical. The system 50 is connected to the movable housing 32*b*.

The second nut 62 in this case is rigidly connected to the movable housing 32*b* and is, for example, mounted on a cowl of said housing on the side opposite the propeller. The movable housing 32*b* translationally displaces along the axis A with the second nut 62 and drives the entire feathering system 50.

The system 50 comprises an electric motor 52, which is preferably an asynchronous machine (so as not to generate resistive torque).

The stator of the electric motor 52 of the feathering means 50 is fixed to the movable housing 32*b* between the nut 62 and the first transmission screw 26. The rotor of the electric motor 52 is mounted on a shaft 60.

The shaft 60 is rotationally guided about the axis A by means of a roller bearing 61, in this case a ball bearing, mounted between the shaft 60 and the movable housing 32b. It therefore displaces with said movable housing along the axis A.

The shaft 60 is independent of the shaft 30 of the first electric means 36. The shaft 60 in this case remains contained inside the movable housing 32b.

The shaft 60 sets the first transmission screw 26 into rotation by means of a reduction gear 64, which in this case is also a planet reduction gear. This reducer 64 comprises a planet shaft 64a constrained to rotate with the shaft 60, an outer ring gear 64b surrounding the planet shaft and rigidly connected to the housing 32b and planet gears 64c meshing with the planet shaft 64a and the ring gear 64b and supported by a planet carrier 64d, which in this case is constrained to rotate with the first transmission screw 26. In the example shown, the transmission screw 26 and the planet carrier 64d are formed as a single piece.

The part comprising the planet carrier 64d and the first screw 26 is centred and guided in the housing 32b by a pair of roller bearings 66, in this case ball bearings. These bearings 66 are angular contact bearings. They are reversed and mounted next to each other between the reducer 64 and the transmission screw 26. The first transmission screw 26 is thus translationally blocked relative to the movable housing 32b by the bearings 66, which absorb the axial forces on the housing 32b.

It is thus understood, in relation to the operation of the first transmission screw 26 and of the first nut 28 for modifying the pitch of the blades of the propeller 10, that:

the operation of the first electric means 36 causes an axial displacement X of the transmission screw 26 by means of the displacement of the second nut 62 and of the movable housing 32b;

the operation of the second electric means 52 causes a rotation θ of the transmission screw 26 by means of the reducer 64.

Figure 2:
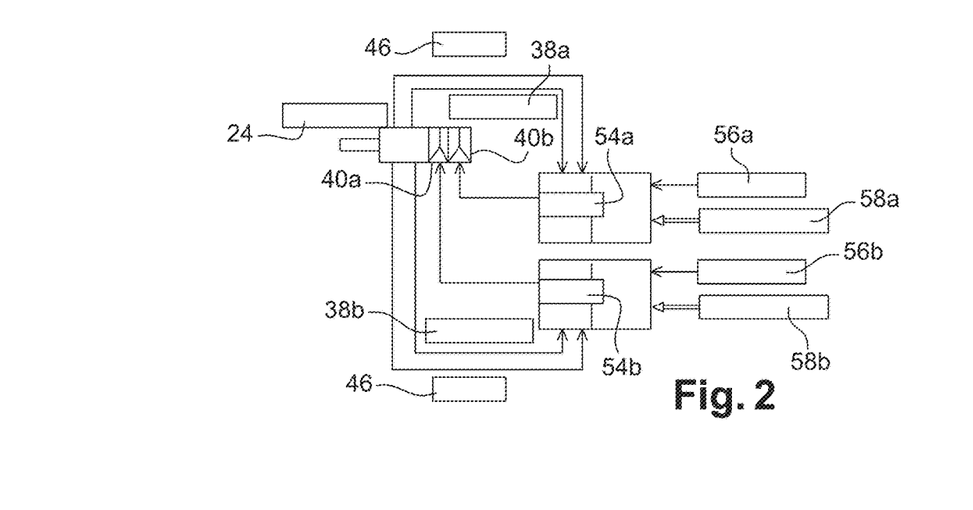
FIG. 2 is a block diagram representing the general architecture of the actuation system and electrical control means of the system of FIG. 1.

Reference will now be made to FIG. 2, which schematically shows the electrical functional diagram of the operation of the system of FIG. 1.

The elements described previously are denoted using the same reference numerals as in FIG. 1.

FIG. 2 particularly shows the means for controlling the electrical machines of the system, namely, in the case where the redundancy applies to all these machines, two LVDT sensors 46, two resolvers 38a, 38b and two electric motors 40a, 40b.

The control means particularly comprise two separate electronic control units 54a, 54b, which are each connected to a resolver, a sensor and an electric motor, and which are able to independently control these machines.

The units 54a, 54b operate in "passive-active" mode. In nominal mode, the pitch is controlled by the electronic unit 54a, for example, and the electronic unit 54b is in passive mode. In the event of a malfunction detected by a position error, for example, the unit 54a is deactivated and the unit 54b is activated. The units 54a, 54b comprise three local interlocked servo-control loops: a torque loop using the phase current measurements, a speed loop using the resolver and a linear position loop using the LVDT sensor. The units 54a, 54b receive the position setpoint respectively from computation units 56a, 56b and are associated with electric networks 58a, 58b in order to send a current command to the motors 40a, 40b.

Even though it is not shown in FIG. 2, the control means further comprise an independent electric power supply device for the electric motor 52.

The architecture thus comprises two transmission chains, one 25 dedicated to controlling the pitch of the vanes, the other 50 dedicated to feathering. Each chain comprises a transmission screw. Only one train is active and the other is passive.

Indeed, when controlling pitch, the electric means 36 are activated in order to rotate the screw 68. The rotation θ' of the screw 68 thus causes an axial displacement X of the second nut 62 and of the movable housing 32b. Advantageously, the electric motor 52 of the second means is arranged to have a residual reluctance torque for countering a rotation of the first transmission screw 26 under the effect of an axial force from the first nut 28 imposed by the blades of the propeller. The first transmission screw 26 is therefore passive, rotationally fixed in this case. Its axial displacement X in turn causes an axial displacement of the eccentric members 20, depending on the operation of the aforementioned decoupling mechanism.

In order to control the displacement of the eccentric members 20 by the second electric means 52 with a view to feathering the blades by the sole rotation of the first transmission screw 26, the second transmission screw 68 must be prevented from being set into rotation θ' by the reaction of the second nut 62, which undergoes the external forces transmitted thereto by the transmission chain of the feathering means. During feathering, the first electric means 36 thus must be actuated in order to create a torque that resists the rotation of the second transmission screw 68.

If the transmission screw 68 of the pitch control chain is blocked in the nut 62 (problem B), the feathering chain can fulfil its function and control the pitch of the blades through the rotation of the first screw 26, since the second transmission screw 68 does not allow the nut 62 to displace.

If the angular bearings 66 in the feathering chain are blocked, the first electric means 36 can be used to modify the pitch so as to implement feathering. Indeed, in this case, the rotation of the first transmission screw 26 is blocked.

This electromechanical type of inventive idea for the pitch actuation system is highly innovative as it offers the following advantages:

- a simple and robust architecture with a minimum number of electromechanical components, whilst complying with the strict reliability criteria;
- elimination of the malfunction associated with hydraulic leakage, which would require the addition of counterweights for feathering;
- elimination of the counterweights of the prior art for feathering of the blades;
- in the case of blocking one of the two transmission screws, the translational control of the eccentric member of the blades remains operational by virtue of the rotation of the unblocked transmission screw;
- the use of an electromechanical system for feathering allows a simple and highly reliable control unit to be used;
- operating with one screw active and the other passive relieves the fatigue of all the mechanical components.

In one variant, not shown, the first electric means 36 can be installed in the movable housing 32b, whereas the electric motor 52 can be installed in the fixed housing 32a, so that the first pitch control means are connected to the movable housing 32b and the auxiliary feathering system is connected to the fixed housing.

In this variant, the planet reduction gear 64 is placed between the shaft of the first electric means 36 and the first transmission screw 36.

The configuration of the planet reduction gear 64, not shown, is then like the previously described configuration. It comprises:
- a planet shaft constrained to rotate with the common rotor of the first electric means 36;
- an outer ring gear surrounding the planet shaft and rigidly connected to the transmission screw 26;
- planet gears meshing with the planet shaft and the ring gear, supported by a planet carrier, which is rigidly connected to the movable housing 32b;
- lack of activation of an additional electric device when switching from one transmission chain to the other;
- no single malfunction generates uncontrolled operation.

The operating modes of this variant differ from the embodiment described with reference to FIG. 1. In particular, in this case, the first electric means directly cause a rotation of the first transmission screw and it is the auxiliary feathering means that control an axial displacement of the movable housing 32a.

The operation of this variant does not need to be described in detail. However, it is obvious that the planet reduction gear with a planet carrier rigidly connected to the movable housing plays a similar role to that of FIG. 1 in the case of blocking of the axial bearings of the shaft of the first electric means.

Indeed, with this malfunction, the reducer prevents the rotation of the transmission screw 26 as a reaction against the axial forces applied through the first nut 28. The second feathering means can then control the axial displacement of said first nut through the displacement of the movable housing 32b.

This electromechanical type of inventive idea for the pitch actuation system is highly innovative as it provides the following advantages: in the event of blocking of the radial force absorption bearing on the first control means side, the feathering control by the second control means can be activated and is operational. A feed for the synchronous machines of the first control means is not required.

The invention claimed is:

1. A pitch actuation system for a turbine engine propeller, comprising an actuator, a main transmission screw which is configured to be connected to blades of the propeller so as to rotate the blades relative to a blade pitch axes (B), characterised in that the actuator is an electromechanical actuator comprising:
   - the main transmission screw that can move with a degree of rotational freedom and a degree of translational freedom along a longitudinal axis (A);
   - a main nut, through which said main transmission screw passes and which cooperates with the main transmission screw so as to translationally displace along the axis (A);
   - a decoupling means configured so that a translational displacement of the main nut causes a modification to the pitch of the propeller blades but so that a rotational displacement of the propeller does not cause a rotational displacement of the main nut, the decoupling means comprising a ring surrounding the main nut and a first rolling bearing mounted between the ring and the main nut, the decoupling means comprising a second rolling bearing mounted between the ring and an element configured to be connected to the blades;
   - a blade pitch control means mounted in a first rotationally locked housing, which means comprise at least one electric motor for driving a first rotor about the axis (A), and a first component set into rotation about the axis (A) by said first rotor by means of a first planet reduction gear, the pitch actuation system being configured to move the main transmission screw in a first degree of freedom from a rotation of said first component;
   - a feathering means, which comprise at least one second electric motor for driving a second rotor about the axis (A), the pitch actuation system being configured to move the main transmission screw in a second degree of freedom when said at least one second electric motor is activated and to block said movement when said second electric motor is not activated,
   and in that said first planet reduction gear comprises a ring gear rigidly connected to said first component, a planet shaft rigidly connected to said first rotor and a planet carrier rigidly connected to said first housing, so as to block the rotation of the ring gear, and thus of the first component, in the event that an axial force absorption bearing is blocked in the blade pitch control means.

2. System according to claim 1, wherein:
   - said first housing is translationally fixed along the axis (A);
   - the blade pitch control means comprise a screw/nut transmission device comprising said first component and a second component cooperating with said first component in order to obtain a translation movement along the axis (A); and
   - the feathering means are configured to set the main transmission screw into rotation and to transfer the translation movement of said second component to the main transmission screw.

3. System according to claim 2, wherein said at least one second electric motor of the blade feathering means comprises a stator supported by a second housing that is mounted to translationally slide only along the axis (A) in the first housing.

4. System according to claim 3, wherein the second component of the screw/nut transmission device of the blade pitch control means is rigidly connected to the second housing.

5. System according to claim 1, wherein said first component is rotationally guided on said first housing by a pair of angular and reversed contact bearings.

6. System according to claim 1, wherein said first rotor is rotationally guided on said first housing by at least one bearing configured to absorb axial forces.

7. System according to claim 1, wherein said pitch control means comprise two electric motors for driving the first rotor.

8. System according to claim 1, wherein the blade feathering means comprise at least one electric motor arranged to introduce a residual reluctance torque capable of rotationally blocking the main transmission screw.

9. Turbine engine, such as a turboprop engine, comprising a propeller, the blades of which are variable-pitch blades, and a system according to claim 1, wherein the main nut is configured to cooperate with eccentric members provided on roots of the blades, the roots being configured to support and rotate the blades.

10. System according to claim 2, wherein the first component of the screw/nut transmission device is a screw and the second component of the screw/nut transmission device is a nut.

11. System according to claim 7, wherein the two electric motors of the pitch control means are synchronous motors.

12. A method for pitch actuation of blades of a turbine engine propeller using a pitch actuation system comprising an electromechanical actuator, a movable part of which comprises a main transmission screw that can move with a degree of rotational freedom and a degree of translational freedom along a longitudinal axis (A) and is configured to rotate the propeller blades relative to a blade pitch axes (B) from the degree of rotational freedom or the degree of the translational freedom, the method being characterised in that it comprises at least:

- a first step of modifying the blade pitch by moving the main transmission screw in a first degree of freedom through an action of a first component of a blade pitch control means, which comprise at least one first electric motor for driving a first rotor about the axis (A) so as to set said first component into rotation about the axis (A) by said first rotor by means of a first planet reduction gear;
- a second step of feathering the blades by moving the main transmission screw in a second degree of freedom through an action of a feathering means, which comprise at least one second electric motor for driving a second rotor about the axis (A), and by blocking said first degree of freedom when said at least one first electric motor is not activated, said first component being rigidly connected to a ring gear of said first planet reduction gear, a planet carrier of said first planet reduction gear being fixedly held and said first rotor being rigidly connected to a planet shaft of said first planet reduction gear.

13. Method according to claim 12, wherein the first component of the blade pitch control means is a screw.

* * * * *